May 30, 1939.   M. G. SCOTT   2,160,292
PACKING MEANS
Original Filed April 3, 1937
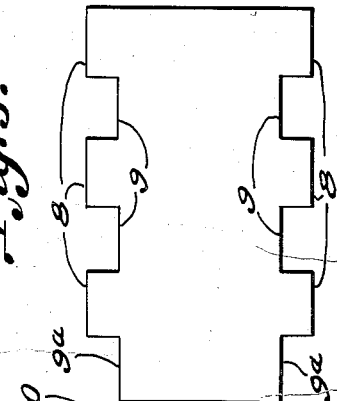
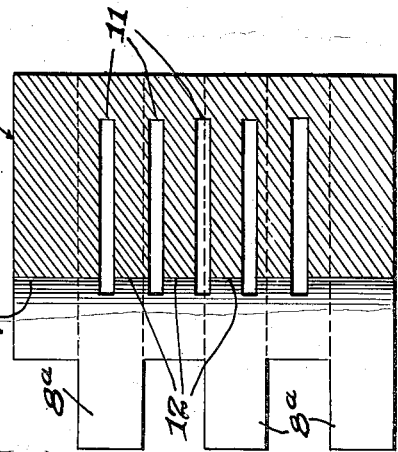
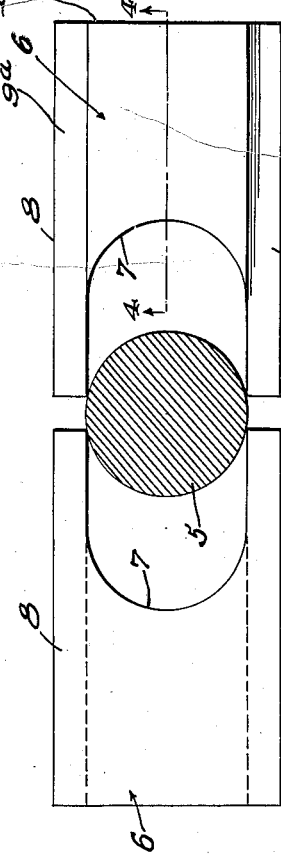
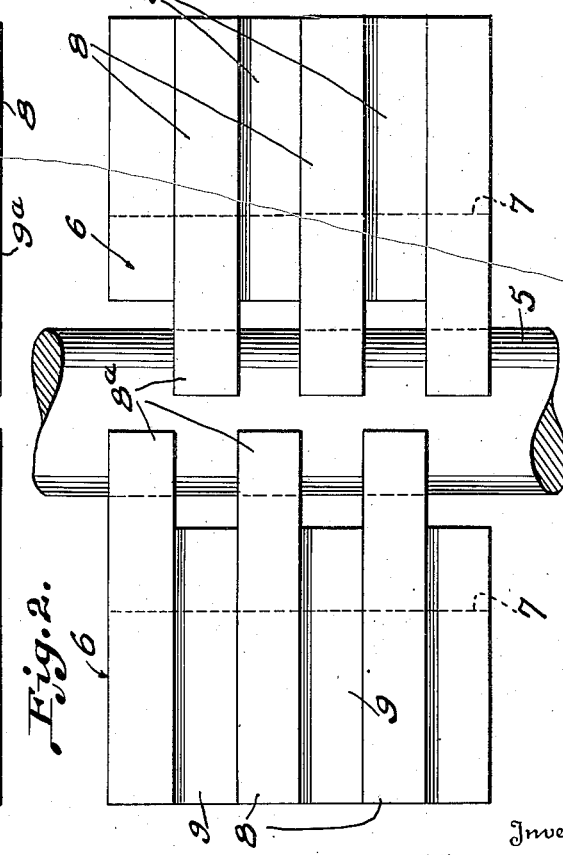
Inventor
Merl G. Scott
By Barry & Cyr
Attorneys Patented May 30, 1939

2,160,292

UNITED STATES PATENT OFFICE 2,160,292

PACKING MEANS

Merl G. Scott, Tulsa, Okla.

Application April 3, 1937, Serial No. 134,882
Renewed June 29, 1938

5 Claims. (Cl. 288—3)

This invention relates to improvements in packing, and more particularly to packing means for use with reciprocating rods or the like.

The primary purpose of the invention is to provide a simple inexpensive packing means designed to form a uniform seal around the rod, shaft or other object sealed by the packing.

A further object is to furnish novel packing means so shaped as to eliminate tearing of the packing and scoring of the rod or the like; the elimination of these prior defects results in longer life of the packing and greater economy in its use.

A still further object is to supply packing means comprising a plurality of resilient members adapted to embrace the element to be packing, and having inter-engaging fingers to insure a perfect seal about the element until at least one of the packing members is entirely used up.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a plan view of my improved packing means showing the members thereof about to embrace an element to be packed, the latter being shown in cross section.

Fig. 2 is an elevation.

Fig. 3 is an end view of one of the packing members.

Fig. 4 is a sectional view of one of the members, partly in elevation, the section being taken on the line 4—4 of Fig. 1.

Referring to the drawing, 5 designates an element to be packed, which may be a reciprocating rod, rotating shaft, or any means which may be embraced by the packing members or blocks 6. As illustrated, the element 5 is a reciprocating cylindrical rod, such as passes through the stuffing box of an oil well pumping mechanism.

Each member 6 may be formed of any suitable packing material, for example, it may be made of the usual rubber or rubber compounds employed in the stuffing boxes used with polish rods or the like.

In accordance with the invention, one end of each of the members 6 is shaped as shown at 7 to conform with the surface of the element to be packed. For instance, if it is used with a cylindrical rod or shaft, the surface 7 will be in the form of a semi-cylindrical groove.

Each member is provided at opposite sides with parallel longitudinal external flanges, tongues or ridges 8 which are spaced apart so as to form complementary grooves 9 which are adapted to telescopically or slidably receive the flanges of the opposite packing member. The two members are preferably identical in shape, whereby if one is turned upside down relatively to the other, its ridges will enter the grooves 9 and cooperating recesses 9a of the opposite member.

The outer end 10 of each member may be of any suitable shape to cooperate with the follower of any preferred stuffing box, not shown; the follower acting in the usual manner to force the packing member toward the element to be sealed.

It will be noted that the ridges 8 form fingers 8a projecting beyond the surfaces 7 so that the inter-engaging fingers will cooperate with the surfaces 7 to cause the packing members to completely surround the element 5 from the outset. Of course, as the surfaces of the packing members become worn, the members are simply pushed toward one another to take up the wear, and in such movement, the flanges 8 and their fingers will simply slide in the grooves or recesses 9, 9a of the opposite packing member.

I prefer to also provide each packing member with a series of slits 11, preferably arranged parallel with one another, and with the ridges 8, so that the surface 7 will be interrupted by these slits and the portions of the member between the slits will form a series of lips 12 to engage the member 5.

While I have disclosed what I now consider to be preferred embodiments of the invention in such manner that the same may be readily understood, it is apparent that changes may be made in the details disclosed, without departing from the spirit of the invention, as expressed in the claims.

What is claimed and desired to be secured by Letters Patent is:

1. A wear compensating packing means comprising a plurality of blocks adapted to embrace the element to be packed, each block being provided at one end portion with a cavity to receive said element, opposite sides of each block being provided with series of spaced straight elongated horizontal tongues and grooves, the tongues of one block being staggered relatively to the tongues of the opposite block and the tongues of each block extending substantially the full length thereof and projecting beyond its cavity end into the grooves of the opposite block, the thickness of each block between its cavity end and its opposite end being materially greater than the transverse thickness of any of said tongues to provide for adjustment of the packing means to take up wear.

2. A packing member comprising an elongated block of rubber-like material having a substantially semi-cylindrical cavity at one end thereof, a series of horizontal tongues positioned at each side of the block and extending lengthwise thereof, the tongues at each side of the block extending substantially the full length thereof, projecting beyond its cavity end and being spaced apart by horizontal grooves of the same configuration as the tongues, whereby the tongues will project into the grooves of an identical block, the outer surfaces of the tongues at one side of the block being in a vertical plane parallel to the plane of the outer surfaces of the tongues at the opposite side of the block, the thickness of the block between its cavity end and its opposite end being materially greater than the transverse thickness of any of said tongues.

3. A wear compensating packing means for a rod-like element comprising a pair of identical members adapted to embrace the member to be packed, each member being formed of rubber-like material and provided at one end portion with a cavity to receive said element, opposite sides of each member being provided with a series of spaced straight elongated tongues and grooves, the tongues of one member when the packing means is assembled being staggered relatively to the tongues of the opposite member, and the tongues of each member extending substantially the full length of the member and projecting beyond its cavity and into the grooves of the opposite member, the thickness of each member between its cavity end and its opposite end being materially greater than the transverse thickness of any of its tongues to provide for adjustment of the packing means to take up wear.

4. A packing for rods including in combination a pair of rubber members, each formed with recessed portions adapted to engage a rod to be packed and having sides formed with a plurality of complementary tongues and grooves adapted to interfit when assembled around a rod to be packed, said tongues projecting beyond said recessed portions and providing for adjustment to be made for wear.

5. A packing for rods including in combination a pair of members formed of packing material adapted to engage a rod to be packed, each of said members being formed with recessed portions and having sides provided with a plurality of interfitting complementary tongues and grooves with the tongues extending beyond said recessed portions, said interfitting tongues and said recessed portions being adapted to embrace the rod to be packed, the construction being such that said members may be moved toward each other in a direction at right angles to the axis of the rod being packed to compensate for wear.

MERL G. SCOTT.